Nov. 24, 1959

C. W. VIETS 2,913,777

PREFABRICATED PREHUNG DOOR STRUCTURE AND
TRIM MOLDING AND METHOD OF INSTALLING

Filed July 25, 1956

INVENTOR.
CHARLES W. VIETS
BY Toulmin & Toulmin
ATTORNEYS

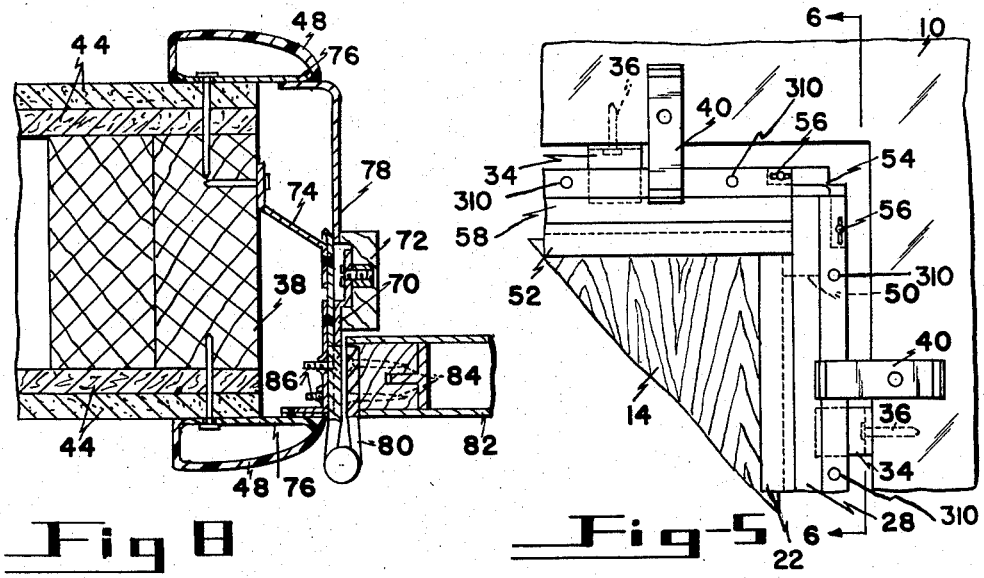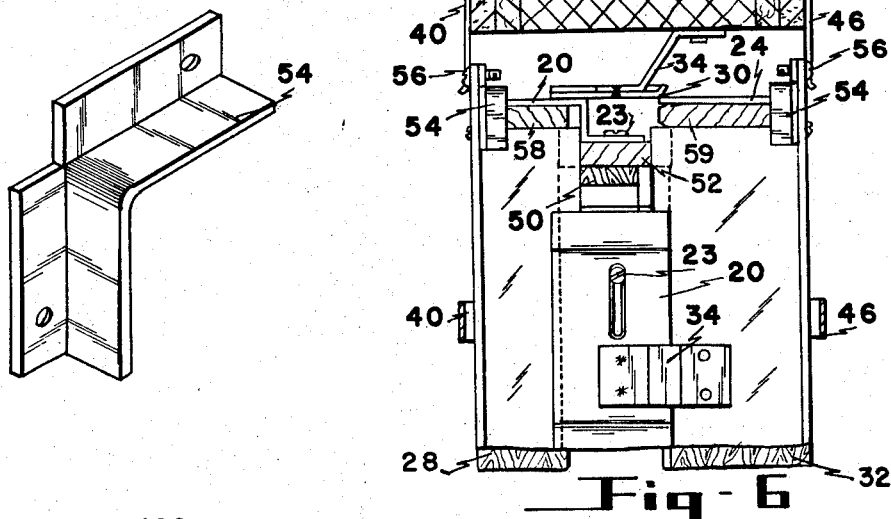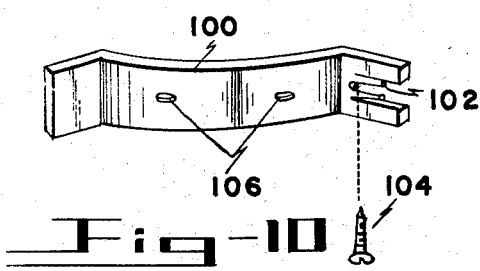

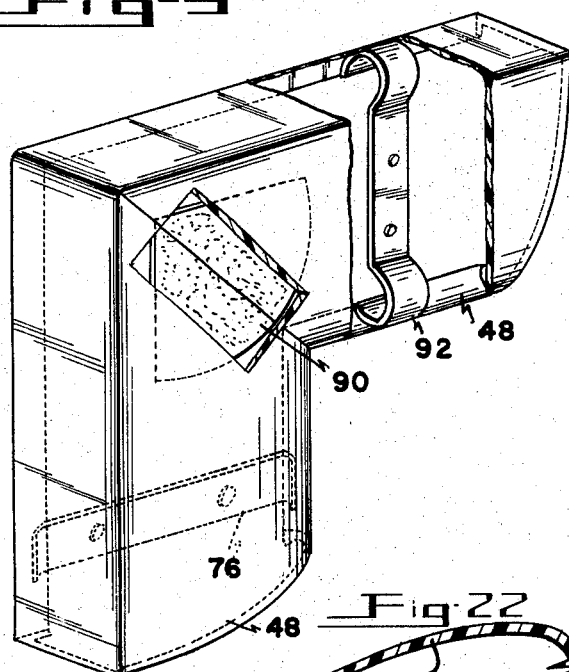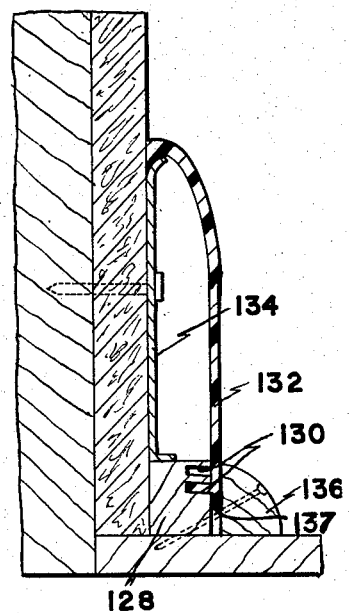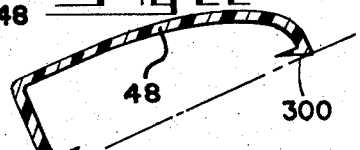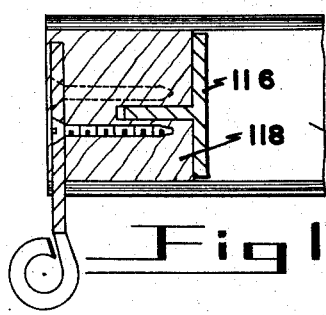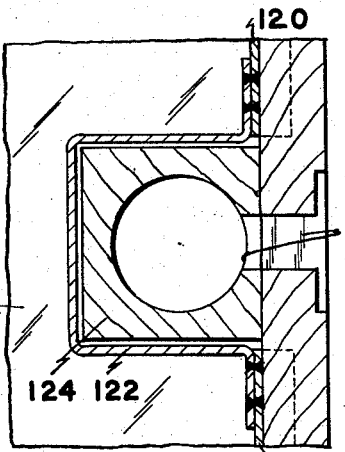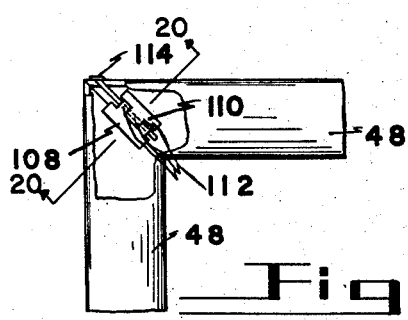
INVENTOR.
CHARLES W. VIETS
BY Toulmin & Toulmin
ATTORNEYS

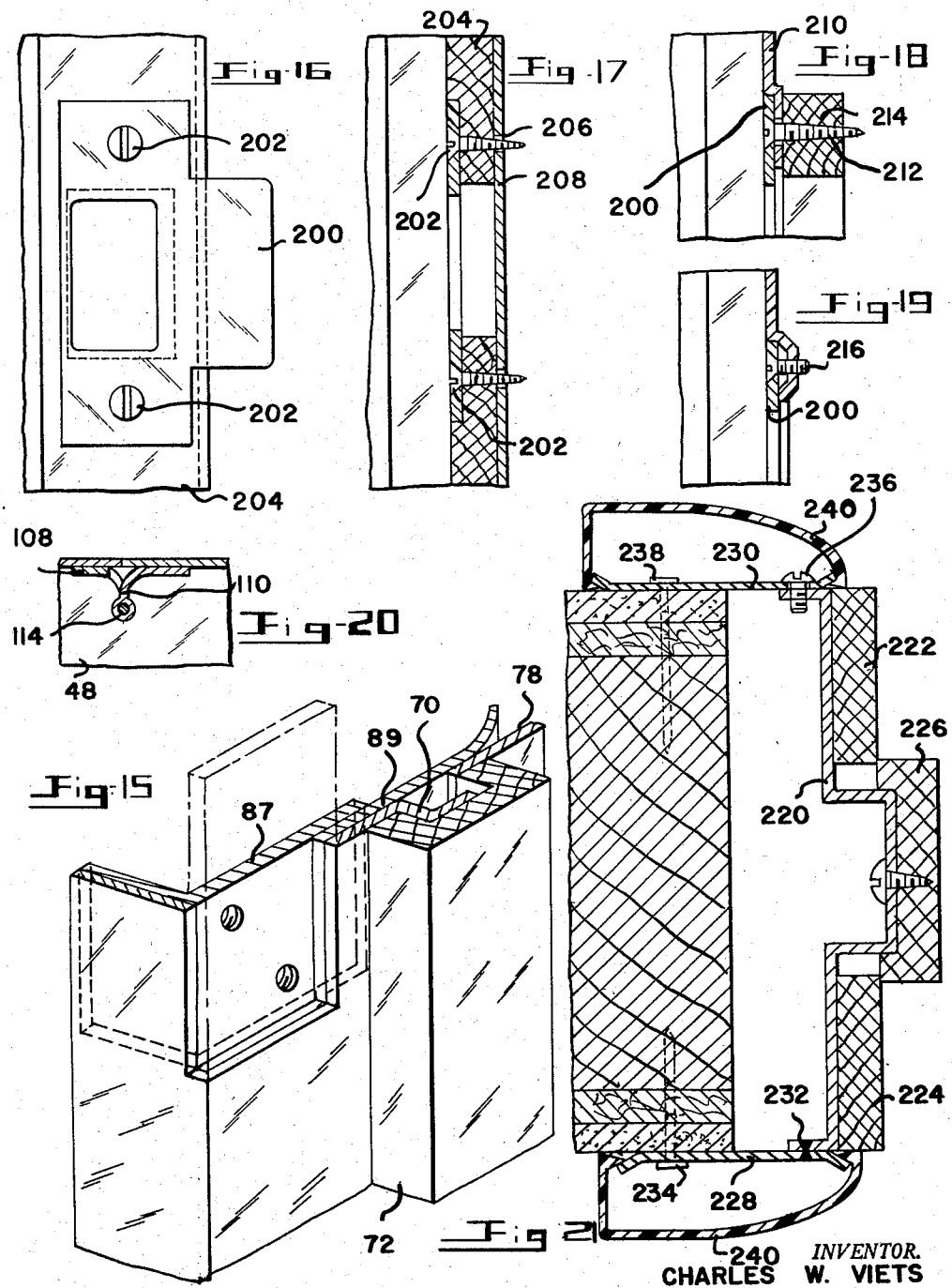

United States Patent Office 2,913,777
Patented Nov. 24, 1959

2,913,777

PREFABRICATED PREHUNG DOOR STRUCTURE AND TRIM MOLDING AND METHOD OF INSTALLING

Charles William Viets, Dayton, Ohio

Application July 25, 1956, Serial No. 600,065

3 Claims. (Cl. 20—11)

This invention relates to doors and the like, and to trim moldings for about doors and like units; and, in particular, relates to prefabricated door units and like assemblies so arranged and constructed that they can readily be assembled in a building in a simple manner and during the final stages of construction, thereby preventing damage to these articles due to work operations which are normally carried out after the fitting of such portions in the building.

In the construction of buildings, particularly residences, one of the problems that has always been troublesome, and also expensive, is that of the fitting of assemblies such as door and frame units into wall openings. This comes about because of the natural variation that will occur from one opening to another, and the necessity of providing units which are at least partially preformed to be received within the said openings, and which must be cut and adjusted to fit the openings.

At the present time, the services of a skilled carpenter is required to install a door frame and door and this, of course, is expensive.

The forming or prefabricating of such units, however, is under rather severe limitations because a completely prefabricated door unit is extremely large and bulky and difficult to handle, and can only be successfully dealt with in the immediate vicinity of the manufacturing plant.

Another difficulty encountered in connection with door units of residences, particularly the doors and the trim, is that more modern styling tends toward natural wood finishes, and it is extremely difficult to obtain adequate field finishing of a plurality of units, such as would go into a typical dwelling, without there being objectionable variations from one unit to another. On the other hand, factory finishing of such units can readily be controlled and, with a large supply of individual elements on hand, the individual units can be compared and supplied in matched sets which would greatly enhance the appearance and thus add to the quality of a dwelling and units of this nature.

A particular problem that is encountered in connection with doors and the trim for doors and windows, in many cases, is that subsequent to the installation of these parts in a dwelling there are work operations carried out within the dwelling whereby the finish of the door or trim could easily become damaged. For example, decorating, and floor finishing, and some parts of the mechanical installations and the like, are work operations that are apt to be carried out after the doors have been put in place within the dwelling.

Another particular problem that arises when such units are to be finished on the job is that of the adverse conditions under which this work must be done. For example, in the presence of plaster dust and saw dust and the like.

At the present time, the doors are often removed from their frames and shifted from room to room in the dwelling while this work is being carried out. This is objectionable because of the time lost and labor involved and often leads to damage of the doors.

Having the foregoing in mind, it is a primary object of the present invention to provide a prefabricated door frame and door therefor which is adapted for use in connection with substantially any conventional type building structure, particularly dwellings.

A particular object of the present invention is the provision of an improved type trim strip for about doors and windows and along the bottoms of walls, and an attaching means therefor.

Another particular object of the present invention is the provision of a prefabricated universal door unit which will permit swinging of the door from either side of its frame or from either side of the opening which it closes.

A still further object of the present invention is the provision of a prefabricated door and frame structure which can readily be adjusted to accommodate for variations in the opening in which the unit is placed, particularly the wall thickness, without detracting in any way from the appearance thereof.

It is also an object of the present invention to provide a prefabricated door unit, including the frame, in which metal parts are employed to provide strength and rigidity while at the same time the metal parts may be concealed by wooden strips or veneer so as to present the appearance of a natural wood frame.

Another object of this invention is the provision of sets of doors and frames which are all prefinished at the factory and which thus match and which do not require a skilled finisher on the job.

Still another object is the provision of a door and frame unit which does not require a skilled carpenter for installation.

The present invention also contemplates the provision of an arrangement for a door frame in which all nail heads are concealed thereby enhancing the appearance of the frame.

These and other objects and advantages of this invention will become more apparent upon reference to the following specification taken in connection with the accompanying drawings, wherein:

Figure 5 is a view of the upper righthand corner of the door frame of Figure 1 drawn in somewhat enlarged scale and with the snap-on plastic trim strips removed;

Figure 6 is a sectional view indicated by line 6—6 on Figure 5 looking in at the side and top members of the frame from the outside thereof;

Figure 7 is a perspective view showing an attaching clip for adjustably connecting the metal parts of the door frame together;

Figure 8 is a sectional view similar to Figure 2 but showing a somewhat modified frame construction;

Figure 9 is a perspective view showing a preferred manner of forming the mitred joint between the top and side pieces of molding at the top corners of the door frame;

Figure 10 is a perspective view showing a modified form of clip for attaching the door frame to the wall and for supporting the molding strip in place;

Figure 11 is a fragmentary view showing still another manner in which the mitred joint between the strips of molding can be formed so that the molding strips are readily detachable;

Figure 12 is a fragmentary sectional view indicated by line 12—12 on Figure 1 showing the manner in which a flush-type door can be constructed according to this invention so as to have a stiffening metal strip therein;

Figure 13 is a section indicated by line 13—13 on Figure 1 showing the manner of forming a door for receiving a lock set; and Figure 14 is a sectional view indicated by line 14—14 on Figure 1 showing the manner in which a molding strip according to the present invention can be adapted for use along a baseboard or the like.

Figure 15 is a sectional perspective view, showing the manner in which the hinge is attached to the jamb in the Figure 8 modification;

Figure 16 is a fragmentary elevational view showing the latch plate in the door frame;

Figure 17 is a sectional view through the latch plate showing how it is mounted on the wood facing strip of the door frame of the Figure 2 modification;

Figure 18 is a fragmentary sectional view showing the latch plate mounted on a metal door frame with a wood supporting block receiving the support screws;

Figure 19 is a view, like Figure 18, but shows another manner of supporting the latch plate on a metal door frame by metal screws;

Figure 20 is a sectional view indicated on line 20—20 of Figure 11;

Figure 21 is a sectional view, similar to Figures 2 and 8, but illustrating a simpler type frame for use where the wall thickness is not subject to variation; and Figure 22 is a sectional view of the molding strip.

Figure 1:
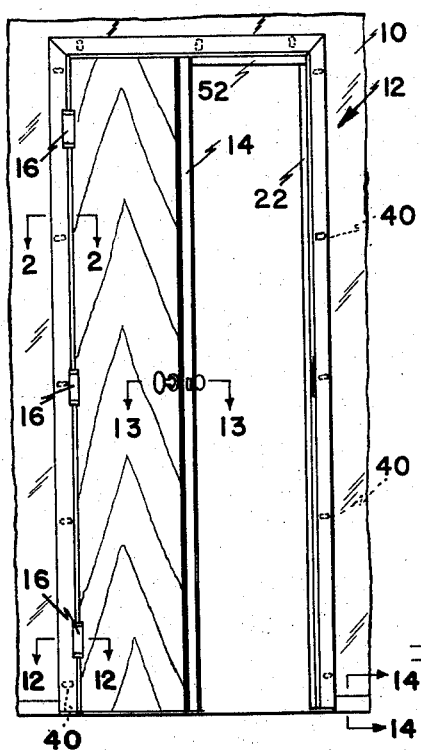
Figure 1 is a front elevational view showing a door and supporting frame embodying the present invention.

Referring to the drawings somewhat more in detail, Figure 1 shows a wall 10 having an opening therein in which is set a door frame 12, to which is hingedly connected a door 14 as by the hinges 16.

According to the present invention the door and door frame are prefabricated and are adapted for being placed in an opening in a wall; the said frame being adjustable in order to accommodate variations in wall thickness and being so arranged that the door can swing either inwardly or outwardly from either side of the opening. This is accomplished by so constructing the frame that it can be inserted from either side of the opening and so that the side members are invertible, and so that the hinges supporting the door can be located on either the right or the left side upon approaching the opening from a given side and can either be in the near side or far side of the frame.

With regard to invertibility of the door frame, this naturally involves an inversion of the door itself, and for this reason the present invention contemplates placing the lock set at a level midway of the length of the door so that in either position of the door the lock set will be at exactly the same height.

The door, according to this invention, can be substantially any conventional type door, but is preferably of the flush type, and it is contemplated prefabricating the door, including the prefinishing thereof, for obtaining uniform sets of doors for dwellings.

The frame in which the door is hung is composed of a combination of materials, with the basic frame being metal and having a wooden stop or jamb for the door, and with the trim mold about the frame being preferably plastic and detachably mounted about the frame.

The construction of the door frame will be more apparent upon reference to Figures 2 through 7, wherein it will be seen that the door frame comprises side and top frame members interconnected and fitted into the wall opening. The left side member of the frame, as viewed in Figure 1, comprises a part 20 to which the door 14 is hingedly connected and which comprises the stop member 22 that the door abuts when closed, and a second part 24 that fits together with the first part and engages the opposite side of the opening in the wall.

Part 20 of the frame comprises an angular metal strip having a portion fitting into a slot in the back of stop member 22, and which stop member is connected therewith by means of screws 23. As will be seen in Figures 3 and 6 screws 23 may extend through slots 26 so that the stop member 22 can be made vertically adjustable on part 20 of the frame for a purpose which will become hereinafter apparent. The stop in some cases could, of course, be fixed to the frame.

Figure 2:
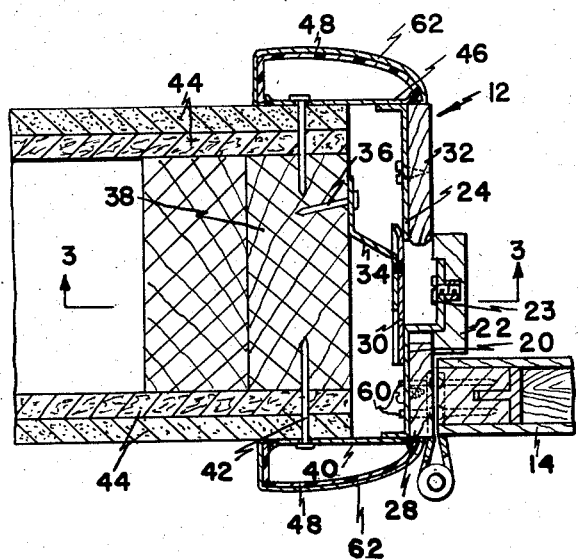
Figure 2 is a sectional view indicated by line 2—2 on Figure 1 showing a portion of the frame of the door according to the present invention.

Part 20 also mounts a wooden strip 28 which, as will be seen in Figure 2, is the strip fitting immediately behind the door, and this strip extends under the edge of stop member 22 whereby expansion and contraction, and the like, will not cause any open joints to appear.

Attached to the back of the angular metal strip forming part 20 is a strip 30 which may be provided at intervals with stiffening corrugations, and which strip 30 is rigidly fixed to part 20 and extends over and beyond the far edge of stop member 22. The edge of strip 30 may be flared outwardly slightly and this facilitates introducing the portion 24 of the frame which, similarly to portion 20, comprises the wooden strip 32. The stop portion 20 may be sprung slightly toward strip 30 so that it will closely embrace the edge of strip 32 when brought together therewith, and in this manner a tight joint is obtained.

Strip 30 is availed of for supporting the angular bracket member 34 rigidly fixed at one end to strip 30, and having their other ends formed with holes to receive nails or screws 36, by means of which they are fixed to the frame studs 38 about the door opening. These bracket members may be deformable to accommodate for different sizes of door openings.

At the outer edge of part 20 of the frame there are the clips 40 which are fixed to their one ends to the frame and at their other ends are apertured to receive nails or screws 42, by means of which they are rigidly fixed to studding 38 and to the wall covering 44 which may be plaster or dry wall.

The portion 24 of the frame on the opposite side has no attaching clips corresponding to clips 34 on part 20, but does embody the clips 46 which correspond to clips 40 in every way.

It may be preferable in many cases, however, particularly where a heavy door is hung in the frame, for the clips 34 to be rigid, and, in this event, the setting of the frame in the door opening would be accomplished by shimming beneath the ends of the clips.

As will be seen in Figure 1, the clips 40 and 46 are located at spaced intervals around the frame of the door, along the sides, and across the top. These clips have their end parts bent up at an angle, as at 47, so as to be able to detachably support the plastic strip or molding 48, which is of substantial thickness and which is relatively hard, and which, therefore, is adapted for being snapped over the clips 40 and 46 to be retained in place thereby.

Figure 3:
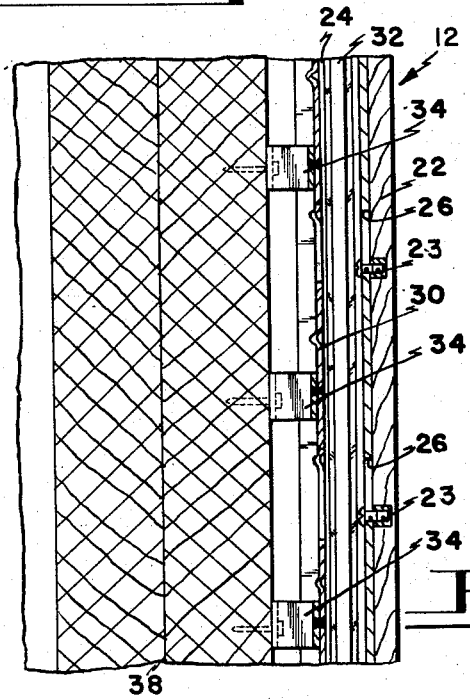
Figure 3 is a sectional view indicated by line 3—3 on Figure 2 showing details of the frame.

As will be seen in Figure 3, the supporting clips 34 are also at spaced intervals about the door frame and, due to the bendable nature of these elements, the upper end of the part 20 of the side of the door frame having the hinges may first be fixed in place, and the remainder of the said part can then be adjusted so as to be perfectly plumb and the clips 40 fastened to the wall. Then, the clips 34 that are not yet attached to studding 38 are bent into contact therewith and nailed in place, thereby rigidly fixing one part of the door frame in its proper location.

If the clips 34 are of the rigid type, then the fitting is done by shims rather than by bending of the clips.

The mating part of the door frame on the same side will, of course, fit into proper position automatically.

This side of the door frame, and which is the hinge side, is set vertically in the door frame and attached thereto. The head of the door frame is then set square, and the opposite side of the door frame is set parallel with the hinge side of the door frame. Any suitable gauge may be employed as a spacer or gauge in order to obtain the proper spacing between the sides of the door frame to give it proper clearance along the sides of the door.

Alternatively, the door frame may be installed by setting the hinge side of the door frame vertically within the opening and fixing it to the adjacent wall. The head of the door frame, and the other side thereof, are then loosely put into position and loosely connected together, and with the hinge side of the door frame. The door is then hung on the hinge side of the frame, and closed and employed as a gauge; and, the head and the other side of the door frame are then fixed rigidly in place within the opening with the proper clearance at the top and side of the door.

It will be noted that the top member of the frame could be constructed without the clips 34 since they are not needed for the support of this member.

Reference to Figures 5 and 6 will show the manner in which the metallic portions of the door frame and the wooden covering strip therefor are connected together at the corners. It will be noted in Figure 5 that the angular portion projecting from the metal part of the frame that supports stop 22 is interrupted at 50 at a point which is below the top edge of stop 22. On the frame part extending across the top of the door, however, the metal portion of the frame, and which can be identical with that along the side of the door, may extend completely to the end of the stop member 52 that corresponds with stop member 22.

It is preferable, however, for the metal portion to be shorter than the stop member, so the head piece can be shortened if necessary to fit the door.

The ends of the metal strips are interconnected by angular attaching clips 54 adjustably connected to the metal strips as by the screws and slots 56. This arrangement provides for precise locating of all parts of the door frame within the opening and relative to each other, and prevents any lateral shifting of the parts thereof relative to each other. Beyond holding the frameparts in alignment there is little load imposed on the angular clip members 54.

The door frame according to the present invention just described has the wooden stop strip 22 and the wooden strips 28 and 32 extending along both sides of the door, and with their being corresponding strips across the top of the door. These strips are brought into abutting relation at the corners of the door, as will be observed in Figure 5, where the stop strip 22 on the side of the door frame abuts beneath the stop strip 52 on top of the frame, whereas, the strips 28 and 32 on the side of the door are abutted by the corresponding strips 58 and 59 across the top of the door. The strips 58 and 59 thus precisely locate the side parts of the door frame.

In connection with the strips 22 it has been mentioned that they are connected with their supporting metal frame members by the screws 23 that extend through the slots 26 in the said metal frame members. The purpose of these slots is to permit vertical adjustment of the strips 22 to bring them into close fitting engagement with the stop strip 52 and also to permit adjustment of the strips 22 when the side frame members are inverted, as will be necessary to fit the frame into some door openings. When the side frame members are so inverted the strips 22 must be moved lengthwise thereof to provide for the necessary clearance at the foot of the door frame and to bring them into abutment with the stop strip 52. In connection with the inversion of the frame, the opposite ends thereof will, of course, be identical as to the provision of slots and holes therein.

The frame of Figures 1 through 6 is adapted for having the hinges of the door connected therewith by metal screws which extend completely through the wood and into the metal strip therebehind, as indicated at 60 in Figure 2. Reinforcing may be provided in the form of an added metal thickness spot welded to the back of the frame to give greater strength and thickness at the hinged regions, if so desired, according to conventional metalworking practices. In this manner, the entire outer surface of the door unit is wood, but the load-bearing portions are metal.

Figure 4:
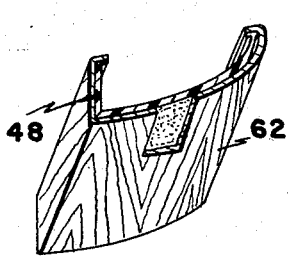
Figure 4 is a fragmentary perspective view showing one manner of forming the plastic trim strips for the door frame and applying a veneer coating thereto.

In order to further enhance the appearance of the unit, particularly where a natural wood finish is desired on all surfaces, the molding strips 48 may have adhesively attached thereto veneer strips 62, as indicated in Figure 4, and which veneer strips may be finished so as to match the remainder of the wood.

A more economical frame can be constructed according to the present invention by eliminating the wood strips on the opposite sides of the stop member. Such a construction is illustrated in Figure 8 wherein the one frame part comprises the angular metal strip 70 on which is mounted stop member 72, and which metal strip is connected by the clips 74 and 76 to the studding about the door opening. The other part of the frame comprises the angular metal strip 78 which has one end fitting between one edge of stop strip 72 and another part of the supporting frame, and its other edge connected by clip 76 with the wall in the side of the opening.

In the frame according to Figure 8, the hinge means 80 are connected with the door 82 by the wood screws 84, but are connected with the frame by the metal screws 86 which, preferably, thread into a strip 87 fastened to the inside of the door frame. The modification of Figure 8 also discloses that the plastic molding strips 48 can be left free of veneer for a natural plastic finish or for receiving paint, if desired.

As will be seen in Figure 15, the member 70 of the jamb, and the strip 89 inside the member, are notched out so a recess is provided the proper depth to receive the hinge. Strip 87 is spot-welded inside the strip 89 and member 70 so as to be rigid therewith.

Figure 9 shows a preferred way of effecting the mitre joints between the top and side molding strips. In this view, the side molding strips are supported in a conventional manner by being snapped over the clip 76, and are fixed to the top molding strips by a formed plastic attachment clip 90 which is cemented to the two strips of molding where they abut. Preferably, this clip is cemented to one of the strips before the frame is assembled and is then cemented to the other strip at the time of placing the molded strips in place.

Since the rigid interconnection between the molding strips, and the necessity of accurately aligning the strips, requires that the top strip of molding be moved straight back at the time of assembling it with the side strip, the attaching clip 92 for the top strip is preferably of a type which is itself resilient, whereby the top strip of molding can be pushed straight over the clip when it is put in place.

I have also found that the expansion and contraction of the plastic molding strips is somewhat different from the wood on which it is mounted, and the resilient supporting clips 92 permit some difference in the expansion between the wall and the side molding strips without effecting the fit of the molding strips at the corners.

The inherent resilience of the plastic trim strips, however, makes it a simple matter to mount them in place at any time and for them to yield to compensate for expansion and contraction of the door frame.

In cases where it might be desired for all of the strips of molding about the door to be separate so as to be individually detachable there may be employed an adjustable attaching strip 100, as shown in Figure 10, wherein the one end of the strip has a slot 102 for receiving the screw 104, by means of which it is adjustably attached to the door frame.

The clip indicated at 100 is provided with apertures 106 for receiving nails to be driven into the wood frame about the door opening, and the clip is preferably somewhat arched to accommodate for any irregularities in the wall to which the clip is attached.

Clips of the nature illustrated in Figure 10, as well as clips such as are shown at 40 in Figure 2, are adapted for being connected about the openings of conventional type doors and windows for supporting trim strips according to the present invention. Further, these clips may be attached to the frame of the present invention close to the mitered corners of the molding strips should it be necessary in order to support the molding strips or to hold them close against the wall at the corners.

It will be understood that in the case of either of the clips referred to it is intended that the clip can be used generally as a supporting element for the molding strips dependently of any particular type of frame.

In using a clip according to Figure 10 one or both of the strips of molding may have attached thereto abutment members so that the ends of the molding will exactly align with each other.

It is also contemplated to utilize a connector, as illustrated in Figures 11 and 20, wherein the vertical side molding strip has attached thereto a member 108 that overhangs the edge of the molding strip somewhat, thereby providing an abutment for the top molding strip. The top molding strip, in turn, carries an attaching member 110. Members 108 and 110 have the turned up apertured portions 112, and these are adapted for receiving therethrough a pin 114 that holds the pieces of molding tightly together. The upstanding portions are resilient and may be so located that when the two molding strips are assembled the horizontal strip is held tightly against the end of the vertical strip and also against the abutment surface provided therefor.

According to this invention, it is proposed to substantially eliminate any warpage of the door by mounting therein a metallic stiffening member, such as the T 116 as shown in Figure 12. The T 116 may be arranged so that the center leg thereof fits in a slot in a stile member 118 forming the back edge of the door, and which back edge has the door hinges attached thereto.

The present invention also contemplates the provision of similar stiffening strips of metal 120 adjacent the front edge of the door, and to which strips are attached a U shaped strip 122 surrounding a block 124 which is bored together with the edge strip of the door, as at 126, for receiving a standard lock set. This kind of arrangement gives a particularly strong door substantially free of any tendency toward warping.

According to the present invention, the molding strip can be adapted for baseboard use by providing a molding strip 128, preferably wood, that is slotted at 130 to receive the lower leg of a molding strip 132 according to this invention which has its upper edge formed to engage the upper bent tip of a metal clip 134. The slots 130 are inclined upwardly, so the molding strip will be held in place when snapped over the support clip 134. A conventional shoe mold 136 completes the trim at the bottom. Projection 137 provides means to pry the trim molding strip out when it is to be removed.

The provision of slots 130 in the molding 128 permits the baseboard to be raised if necessary on account of wall-to-wall carpeting, or the like.

The molding strip of Figure 14 can be covered with veneer if desired, or may be decoratively coated by paint, or the natural plastic finish may be retained if so desired.

In the case of any of the molding strips referred to plastic is the preferred material from which they are formed, but metal is also a possible material, since it meets all of the requirements except that it does not have as high impact strength as a properly selected plastic material.

In any case, the advantages obtained according to the present invention of doors and door frames which can be prefabricated and prefinished at the factory by insuring the possibility of placing matched sets in a dwelling. No work must be done on the unit after it is received on the job site except to assemble it in the opening and to cut off any excess that may be allowed on the bottom ends of the frame to accommodate for different clearance and for uneven floors.

As has been mentioned, the door and side members are both invertible, so that the door can be opened from either side of the wall opening and can be hinged to either side edge thereof. In connection with the inverting of the door frame and the fitting of it to different wall openings, it is preferable for the wood strips to extend beyond both ends of the metal strips. Only a wood saw is necessary to modify the dimensions of the frame to form a close fit of the frame in the opening. Further, the bottom ends of the side pieces can be made to fit uneven floors in this manner. In any case, and including the case of a metal frame as is shown in Figure 8, the frame can be modified by no more complex tool than a hacksaw.

In connection with the mounting of the trim strips about the door frame, I have found that the arrangement of Figure 9, wherein the top and side trim strips are cemented together, can be utilized without the resilient supporting clip merely by spacing the regular clips for supporting the trim molding a sufficient distance away from the joint being made to take advantage of the natural resilience of the material from which the molding strips are made.

It will be evident that an advantage of the present invention resides in the fact that the door frame can be knocked down for shipment and this provides for the best possible shipping conditions. In providing a set of doors and frames, and the like, for a dwelling it could thus be possible to provide a relatively compact package of the matched and factory-finished units for being installed in roughed-in openings in the walls of the building being erected.

It will be understood that any of the doors described above would have associated therewith a latch plate which would be of a conventional structure. Such a latch plate is illustrated in Figure 16 which shows the manner in which the latch plate is attached to the door frame.

In Figure 16, and as also shown in Figure 17, which is a section through the latch plate, the latch plate 200 is attached by wood screws 202 to the wooden strip 204 forming a part of the door frame. These screws may extend through the clearance holes 206 provided in the metal portion 208 of the door frame.

The door frame illustrated in Figure 17 is of the type illustrated in Figure 2, but it will be understood that the latch plate could readily be attached to a metal type door frame of the nature shown in Figure 8. This sort of mounting is illustrated in Figure 18, wherein the metal door frame 210 is formed to have a recess for receiving the latch plate 200, and with the latch plate being retained in position by the wood screws 212 that extend through the bottom wall of the recess in the frame and into the wooden block member 214 on the inside of the door frame.

Figure 19 illustrates still further arrangement for supporting the latch plate 200 on a metal frame, and in this figure it will be seen that there are dimples pressed into the bottom wall of the recess that receives the latch, with these dimples being drilled and, if desired, threaded to receive the metal screws 216. In any case, the latch plate would be located in the middle of the frame member, so that the frame member could be inverted for hinging the door to the opposite edge of the door opening, if so desired.

In many instances, a prefabricated unit of the nature described would be provided for use in locations where the thickness of the wall in which it was to be mounted would be held within closely predetermined limits. This would arise, for example, in connection with prefabricated structures where the walls were constructed under closely supervised factory conditions.

In a case of this nature, it will be evident that the feature of the adjustability of the front and back portions of the frame relative to each other could be dispensed with, and the frame made as a single unit without this adjustability, but still retaining the feature of prefabrication under factory conditions and ease of installation without the use of skilled carpenters and with the feature of the snap-on trim mold.

A frame of the nature referred to above is illustrated in Figure 21, where the frame will be seen to comprise a metal part 220 to which is attached the wood strips 222 and 224 and the centrally located adjustable stop strip 226. According to this invention, the door could be mounted adjacent either of the strips 222 or 224, and on either side edge of the door opening. The setting of the frame in the opening is done the same way as previously described, and the head piece is also put in place as previously described.

The metal part 220, and which might be constructed without the wooden strips 222 and 224 as brought out in connection with the Figure 8 modification, is provided with support strips or clips spaced thereabout corresponding with the clips 34 of the first-described modification and identified at 228 in Figure 21 on the bottom of the view and at 230 on the top of the view.

The clips 228 may advantageously be spot-welded as at 232 to the metal frame part 220, and are adapted for receiving the nails or screws 234 by means of which the frame is attached to the studding outlining the opening of the frame in which it is mounted. At the opposite side of the wall opening, the clips 230 are adapted for being attached to the frame 220 by the screws 236, and these clips, in turn, are attached to the said studding by the screws or nails 238.

By the arrangement illustrated, the frame can be readily set into an opening and the clips 230 attached, and the entire frame properly aligned and attached to the wall. The clips 228 and 230, similar to the clips 34, are adapted for receiving the snap-on trim strips 240.

Figure 22 illustrates in section the trim strip or molding 48; and, in this view, it will be noted that the turned-in edges 300 are inclined somewhat upwardly so that the molding will rest against the wall surface with substantially a line contact, thereby insuring the best possible fit under all circumstances, and substantially permitting gaps from appearing due to distortion of the turned-in edge portions of the molding strip.

In connection with the supporting clips for the door frame, these clips being indicated at 40 in Figures 2 and 5 and at 76 in Figure 8, it is, of course, conceivable that these clips might be separate from the metal part of the frame and attached thereto by screws, preferably self-tapping metal screws. This would enable the frame to be made up with a plurality of holes formed therealong as at 310 in Figure 5, which would permit as many or as few of the clips to be employed as was necessary to provide for a firm connection of the frame with the door opening; and, also, to provide clips to support the molding strip in proper relationship to the wall, in case the wall was somewhat irregular.

It will be understood that the frame of Figure 21 could include all of the various features referred to above, and that it could be constructed either to have the wood strips thereon as illustrated, or that it could be constructed so as to have only a wood stop member down the center, and the remainder of the exposed part of the frame would be metal.

It will be understood that this invention is susceptible to modification in order to adapt it to different usages and conditions; and, accordingly, it is desired to comprehend such modifications within this invention as may fall within the scope of the appended claims.

I claim:

1. In a prefabricated arrangement for a wall opening; a first frame part adapted to fit into the opening from one side of the wall in spaced relation with the opening, means to secure the first frame part to the outer face of the wall and to the surface of the opening in fixed relation thereto, and a second frame part adapted to fit into the opening from the other side of the wall and slidably to engage said first frame part, and means to secure the second frame part to the face of the wall to complete the framing about the said wall opening, the means securing the frame parts to the wall including clips on the face of the wall, and trim molding detachably supported on the clips and covering the clips and the edges of the frame parts.

2. In a prefabricated door frame; side and top frame members, each member comprising two metal parts each having a first leg extending into a door opening in a wall with lateral clearance about the opening and a second leg substantially co-planar with the adjacent wall surface, said first legs being in overlapping relation, first clips fixed to the second legs in spaced relation therealong extending over the adjacent wall face for being affixed thereto to support the frame in the opening, other clips secured to one of said first legs to engage the inside edge of the opening additionally to support the frame in the opening, an angular projection on one of the legs, a stop member having a channel in the back to receive said projection and secured thereto, said stop member and the leg on which it is mounted forming a slot into which the said first leg of the other part of the frame member extends in close-fitting telescopic relation, the said first legs having wood facing strips thereon in overlapping relation with said stop member, said first clips being adapted for detachably supporting a trim strip the edges of which extend over the wall surface and overlap the edges of said facing strips, said frame members being spaced at the corners of the opening, and angular connectors adjustably interconnecting the adjacent ends of said members and holding them in co-planar alignment.

3. In a prefabricated door frame; side and top frame members, each member comprising two metal parts each having a first leg extending into a door opening in a wall with lateral clearance about the opening and a second leg substantially co-planar with the adjacent wall surface, said first legs being in overlapping relation, first clips fixed to the second legs in spaced relation therealong extending over the adjacent wall face for being affixed thereto to support the frame in the opening, other clips secured to one of said first legs to engage the inside edge of the opening additionally to support the frame in the opening, an angular projection on one of the legs, a stop member having a channel in the back to receive said projection and secured thereto, said stop member and the leg on which it is mounted forming a slot into which the said first leg of the other part of the frame member extends in close-fitting telescopic relation, the said first legs having wood facing strips thereon in overlapping relation with said stop member, said first clips being adapted for detachably supporting a trim strip the edges of which extend over the wall surface and overlap the edges of said facing strips, said frame members being spaced at the corners of the opening, and angular connectors adjustably interconnecting the adjacent ends of said members and holding them in co-planar alignment, said stop member and said wood facing strips extending beyond both ends of the supporting metal part therefor.

(References on following page)

References Cited in the file of this patent

UNITED STATES PATENTS

| | | | |
|---|---|---|---|
| Re. 24,285 | Jackson | Mar. 12, 1957 |
| 899,259 | Ohnstrand | Sept. 22, 1908 |
| 1,321,610 | Emrich | Nov. 11, 1919 |
| 1,731,459 | Gross | Oct. 15, 1929 |
| 1,802,049 | Draper | Apr. 21, 1931 |
| 2,260,484 | Rumsey | Oct. 28, 1941 |
| 2,346,264 | Marshall | Apr. 11, 1944 |
| 2,454,523 | Philip | Nov. 23, 1948 |
| 2,579,943 | Marchand | Dec. 25, 1951 |
| 2,721,634 | Barraco | Oct. 25, 1955 |